United States Patent
Yoneda

(10) Patent No.: US 12,030,751 B2
(45) Date of Patent: Jul. 9, 2024

(54) CRANE INFORMATION DISPLAY SYSTEM

(71) Applicant: TADANO LTD., Kagawa (JP)

(72) Inventor: Mizuki Yoneda, Kagawa (JP)

(73) Assignee: TADANO LTD., Kagawa (JP)

( * ) Notice: Subject to any disclaimer, the term of this patent is extended or adjusted under 35 U.S.C. 154(b) by 268 days.

(21) Appl. No.: 17/763,022

(22) PCT Filed: Sep. 25, 2020

(86) PCT No.: PCT/JP2020/036270
§ 371 (c)(1),
(2) Date: Mar. 23, 2022

(87) PCT Pub. No.: WO2021/060466
PCT Pub. Date: Apr. 1, 2021

(65) Prior Publication Data
US 2022/0340398 A1    Oct. 27, 2022

(30) Foreign Application Priority Data

Sep. 27, 2019   (JP) .................................. 2019-176758

(51) Int. Cl.
*B66C 13/46* (2006.01)
*G06T 7/73* (2017.01)
*G06T 19/00* (2011.01)

(52) U.S. Cl.
CPC .............. *B66C 13/46* (2013.01); *G06T 7/73* (2017.01); *G06T 19/006* (2013.01)

(58) Field of Classification Search
CPC ....... B66C 13/46; B66C 13/40; B66C 23/905; B66C 23/90; G06T 7/73; G06T 19/006; G06T 7/70
See application file for complete search history.

(56) References Cited

U.S. PATENT DOCUMENTS

| | | | |
|---|---|---|---|
| 9,916,506 B1 * | 3/2018 | Davis ..................... | G06V 10/22 |
| 11,554,939 B2 * | 1/2023 | Bergmayr ............... | G06F 3/165 |

(Continued)

FOREIGN PATENT DOCUMENTS

| | | | |
|---|---|---|---|
| JP | 08133677 A | * | 5/1996 |
| JP | 2005219932 A | * | 8/2005 |

(Continued)

OTHER PUBLICATIONS

Lei, Zhen & Taghaddos, Hosein & Hermann, Ulrich & Al-Hussein, Mohamed. (2013). Integrating Mobile Crane Lift Path Checks into an Industrial Crane Management System. 10.22260/ISARC2013/000 (Year: 2013).*

(Continued)

*Primary Examiner* — Fadey S. Jabr
*Assistant Examiner* — Mark Robert Heim
(74) *Attorney, Agent, or Firm* — Paratus Law Group, PLLC

(57) ABSTRACT

This crane information display system is provided with a terminal device having a camera and captures an image of a crane with the camera to obtain a camera image, the crane information display system including a crane information acquisition unit that reads display information of an information display unit, which is mounted in the crane, from the camera image and acquires information about the crane; a position/orientation calculation unit that calculates the position and orientation of the crane from the camera image; an information processing unit that converts the information about the crane acquired by the crane information acquisition unit into three-dimensional image information corresponding to the position and orientation of the crane calculated by the position/orientation calculation unit; and an image display unit that overlays the information about the (Continued)

crane converted by the information processing unit on the camera image and displays the same.

2 Claims, 4 Drawing Sheets

(56) References Cited

U.S. PATENT DOCUMENTS

| | | | | |
|---|---|---|---|---|
| 2005/0192732 | A1* | 9/2005 | Narisawa | B66C 23/905 |
| | | | | 700/83 |
| 2011/0311127 | A1* | 12/2011 | Mizutani | G06T 7/80 |
| | | | | 901/1 |
| 2012/0320088 | A1* | 12/2012 | Ihara | G05B 23/0216 |
| | | | | 345/629 |
| 2014/0035923 | A1* | 2/2014 | Oshima | G06T 11/60 |
| | | | | 345/440 |
| 2016/0063709 | A1* | 3/2016 | Booij | B66C 23/52 |
| | | | | 348/142 |
| 2017/0032526 | A1* | 2/2017 | Gao | G06T 7/246 |
| 2017/0217737 | A1* | 8/2017 | Rudy | B66C 13/46 |
| 2018/0251961 | A1* | 9/2018 | France | B60R 1/00 |
| 2018/0282131 | A1* | 10/2018 | Hayashi | B66C 13/44 |
| 2023/0278834 | A1* | 9/2023 | Appling, Jr. | H04L 67/12 |
| | | | | 701/2 |

FOREIGN PATENT DOCUMENTS

| | | | | | |
|---|---|---|---|---|---|
| JP | | 2011151742 | A | * | 8/2011 |
| JP | | 2014-227281 | A | | 12/2014 |
| JP | | 2014227281 | A | * | 12/2014 |
| JP | | 2018095366 | A | * | 6/2018 |
| JP | | 2020066520 | A | * | 4/2020 |
| JP | | 2022166669 | A | * | 11/2022 |
| JP | | 2023115393 | A | * | 8/2023 |
| WO | WO-2011122610 | A1 | * | 10/2011 | ......... G05B 23/0216 |
| WO | WO-2017065093 | A1 | * | 4/2017 | ............ B66C 13/40 |

OTHER PUBLICATIONS

WO2017065093A1 machine translation (Year: 2017).*
JP-2011151742-A machine translation (Year: 2011).*
JP-2014227281-A machine translation (Year: 2014).*
JP-2018095366-A machine translation (Year: 2018).*
JP-2023115393-A machine translation (Year: 2023).*
WO-2011122610-A1 machine translation (Year: 2011).*
JP-08133677-A machine translation (Year: 1996).*
JP-2005219932-A machine translation (Year: 2005).*
JP-2022166669-A machine translation (Year: 2022).*
JP-2020066520-A machine translation (Year: 2020).*
Nov. 24, 2020, International Search Report issued for related PCT application No. PCT/JP2020/036270.
Nov. 24, 2020, International Search Opinion issued for related PCT application No. PCT/JP2020/036270.

* cited by examiner

CRANE INFORMATION DISPLAY SYSTEM

CROSS REFERENCE TO PRIOR APPLICATION

This application is a National Stage Patent Application of PCT International Patent Application No. PCT/JP2020/036270 (filed on Sep. 25, 2020) under 35 U.S.C. § 371, which claims priority to Japanese Patent Application No. 2019-176758 (filed on Sep. 27, 2019), which are all hereby incorporated by reference in their entirety.

TECHNICAL FIELD

The present invention relates to a crane information display system.

BACKGROUND ART

Conventionally, a crane information display system that displays information of a crane is known (for example, see Patent Literature 1).

Patent Literature 1 discloses a configuration that visualizes information on an operating state of a crane and displays a display screen on a display unit of a mobile terminal. As a result, even a person outside the crane can see the operating state of the crane.

CITATION LIST

Patent Literature

Patent Literature 1: JP 2014-227281 A

SUMMARY OF THE INVENTION

Problems to be Solved by the Invention

However, in the configuration disclosed in Patent Literature 1, information on an operating state of a crane is visualized and displayed by drawing the crane from above or from the side. Therefore, in the configuration disclosed in Patent Literature 1, there is a problem in that it is necessary to examine it in two-dimensions.

Therefore, an object of the present invention is to provide a crane information display system capable of enabling information about a crane at a work site to be three-dimensionally examined.

Solutions to Problems

A main disclosure for solving the above-described problem is a crane information display system that is provided with a terminal device having a camera and captures as image of a crane with the camera to obtain a camera image, the crane information display system including a crane information acquisition unit that reads display information of an information display unit, which is mounted in the crane, from the camera image and acquires information about the crane, a position/orientation calculation unit that reads display information of the information display unit, acquires information about a reference shape of the information display unit and a mounting position of the information display unit on the crane from the camera image, extracts a contour shape of the information display unit reflected in the camera image, and calculates the position and orientation of the crane based on the information about the reference shape of the information display unit, the mounting position of the information display unit, and the contour shape of the information display unit, an information processing unit that converts the information about the crane acquired by the crane information acquisition unit into three-dimensional image information corresponding to the position and orientation of the crane calculated by the position/orientation calculation unit, and an image display unit that overlays the information about the crane converted by the information processing unit on the camera image and displays the information.

Effects of the Invention

In the crane information display system of the present invention configured as described above, information about a crane can be examined three-dimensionally at a work site.

DESCRIPTION OF EMBODIMENTS

Figure 1:
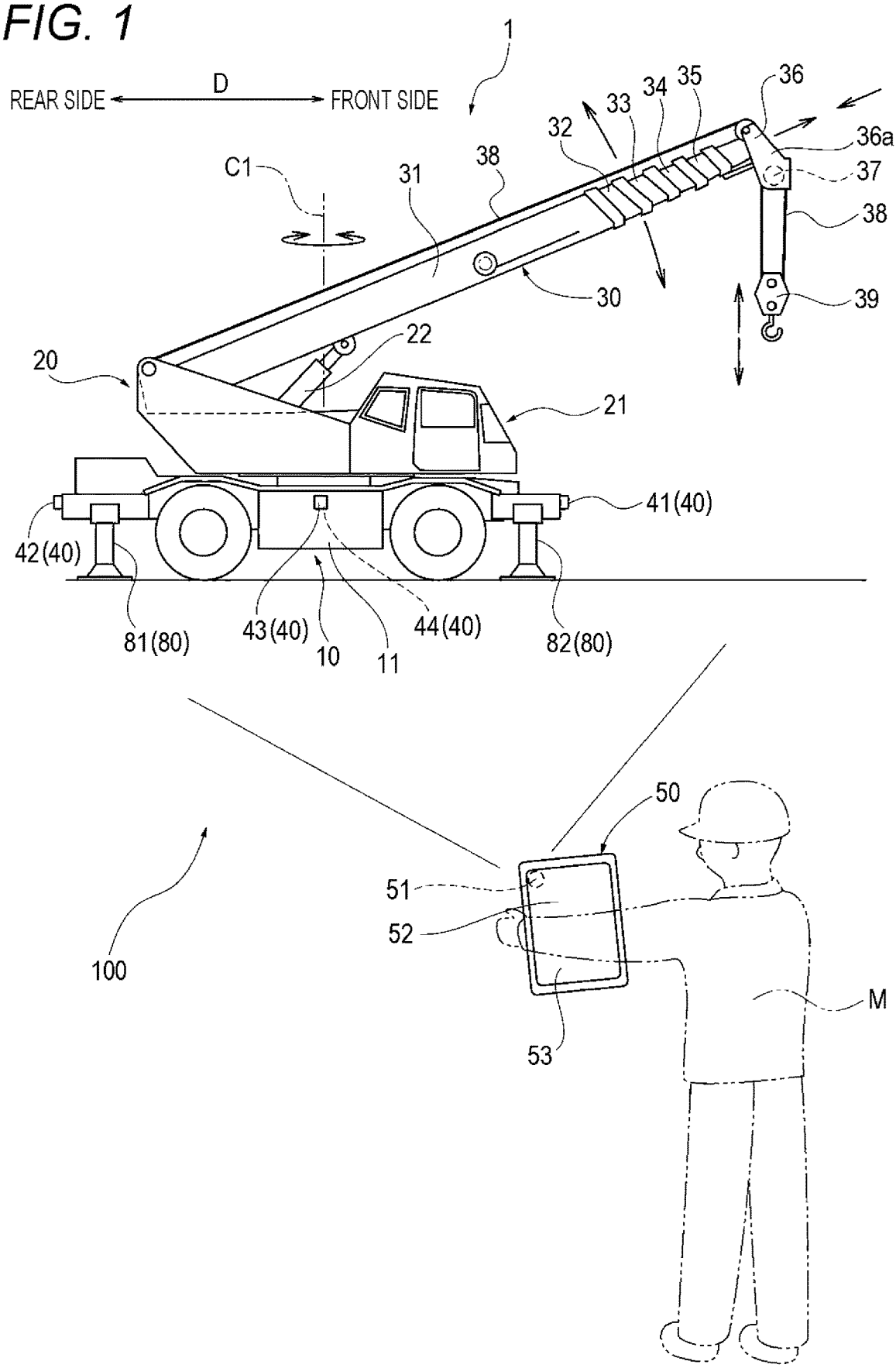
FIG. 1 is a diagram illustrating a crane information display system according to Example 1.

Hereinafter, embodiments for achieving a crane information display system according to the present invention will be described with reference to Example 1 illustrated in the drawings.

EXAMPLE 1

[Configuration of Crane Information Display System]

FIG. 1 is a diagram illustrating a crane information display system of Example 1. Hereinafter, a configuration of the crane information display system of Example 1 will be described.

As illustrated in FIG. 1, an example in which, in the crane information display system 100 of Example 1, a worker M captures an image of a crane 1 placed at a work site with a tablet terminal 50 as a user terminal provided with a camera 51 will be described. An example in which the crane information display system 100 of Example 1 captures an image of the crane 1 with the camera 51 in a state where an outrigger 80 does not protrude will be described. The front-rear direction of the crane 1 is defined as a front-rear direction D.

[Configuration of Crane]

As illustrated in FIG. 1, the crane 1 includes a traveling body 10, a swirling body 20, and a boom 30.

The traveling body 10 includes a vehicle body, frame 11, the outrigger 80, a traveling device for self-traveling on a road or a work site, and the like.

The outrigger 80 includes a rear outrigger 81 attached to a rear side surface of the vehicle body frame 11 of the traveling body 10 and a front outrigger 82 attached to a front side surface of the vehicle body frame 11. The outrigger 80 is stored in the vehicle body frame 11 during travel. On the other hand, at the time of work, the outrigger 80 protrudes in the horizontal direction and the vertical direction, lifts the entire vehicle body, and stabilizes the orientation.

An April Tag (April Tag) is attached to the vehicle body frame 11 of the traveling body 10 as an information display unit 40 (that is, a marker). The information display unit 40 includes a first information display unit 41 attached to the front surface of the vehicle body frame 11, a second information display unit 42 attached to the rear surface of the vehicle body frame 11, a third information display unit 43 attached to the right side surface of the vehicle body frame 11, and a fourth information display unit 44 attached to the left side surface of the vehicle body frame 11. The first information display unit 41, the second information display unit 42, the third information display unit 43, and the fourth information display unit 44 each have separate display information (that is, code information) of, for example, text, a code, a symbol, a pattern, or the like attached to the surface thereof. The display information (that is, the code information) held by each of the first information display unit 41, the second information display unit 42, the third information display unit 43, and the fourth information display unit 44 can be read from the camera image generated by the camera 51 using a decoding program stored in advance in a control unit 60 (described later) or the like.

The first information display unit 41 records information about the model of the crane 1, information about the position where the first information display unit 41 is attached in the crane 1, and the shape and size of the first information display unit 41. The second information display unit 42 records information about the model of the crane 1, information about the position where the second information display unit 42 is attached in the crane 1, and the shape and size of the second information display unit 42. The third information display unit 43 records information about the model of the crane 1, information about the position where the third information display unit 43 is attached in the crane 1, and the shape and size of the third information display unit 43. The fourth information display unit 44 records information about the model of the crane 1, information about the position where the fourth information display unit 44 is attached in the crane 1, and the shape and size of the fourth information display unit 44. The shapes and sizes recorded in the first information display unit 41, the second information display unit 42, the third information display unit 43, and the fourth information display unit 44 are, for example, shapes and sizes obtained from a predetermined distance in front (hereinafter referred to as a "reference shape" and a "reference size").

The first information display unit 41, the second information display unit 42, the third information display unit 43, and the fourth information display unit 44 have the same outer shape (for example, a rectangle) and the same size. The first information display unit 41, the second information display unit 42, the third information display unit 43, and the fourth information display unit 44 can be identified from the display information (that is, the code information) held by each.

The swirling body 20 is provided above the traveling body 10 and is rotatable about a vertical axis C1 with respect to the traveling body 10. The swirling body 20 includes a cabin 21. The cabin 21 includes an operation unit (for example, a steering wheel, a shift lever, an accelerator pedal, a brake pedal, and the like) for controlling traveling of the traveling body 10. The cabin 21 includes an operation unit that operates the swirling body 20, a boom 30, a winch, or the like. The operator riding in the cabin 21 operates the operation unit to swing the swirling body 20, raise and lower the boom 30, extend and contract the boom 30, and rotate the winch to perform the work.

The proximal end side of the boom 30 is supported by the swirling body 20, and is attached to the swirling body 20 to be raised and lowered. The boom 30 is raised and lowered by a raisable/lowerable cylinder 22 provided in the swirling body 20, and is expanded and contracted by a telescopic cylinder (not illustrated).

The boom 30 includes intermediate booms 32 to 35 between a proximal end boom 31 on the proximal side and a distal end boom 36 on the distal end side. The intermediate booms 32 to 35 and the distal end boom 36 are telescopically stored in the proximal end boom 31 in sequence.

A sheave 37 is disposed in a boom head 36a provided at the distal end of the distal end boom 36. A wire rope 36 for a suspended load is wound around a winch provided near the proximal end of the boom 30 of the swirling body 20. The wire rope 38 is disposed along the boom 30 from the winch to the sheave 37 in the axial direction, and the wire rope 38 wound around the sheave 37 is suspended downward in the vertical direction from the sheave 37. A hook 39 is provided at the lowermost portion of the wire rope 38.

A load is hung on the hook 39, the wire rope 38 wound around the winch is unwound to lower the hook 39, and the wire rope 38 is wound up to raise the hook 39.

The crane 1 configured as described above moves the load hung on the hook 39 to a predetermined position by unwinding and winding the wire rope 38 by the winch, raising, lowering, extending, and contracting the boom 30, and swinging the swirling body 20.

[Configuration of Tablet Terminal]

As illustrated in FIG. 1, the tablet terminal 50 includes the camera 51, an image display unit 52, and an input unit 53.

An image captured with the camera 51 is displayed on the image display unit 52. The image display unit 52 is also configured as a touch panel as the input unit 53.

[Functional Configuration of Crane Information Display System]

Figure 2:
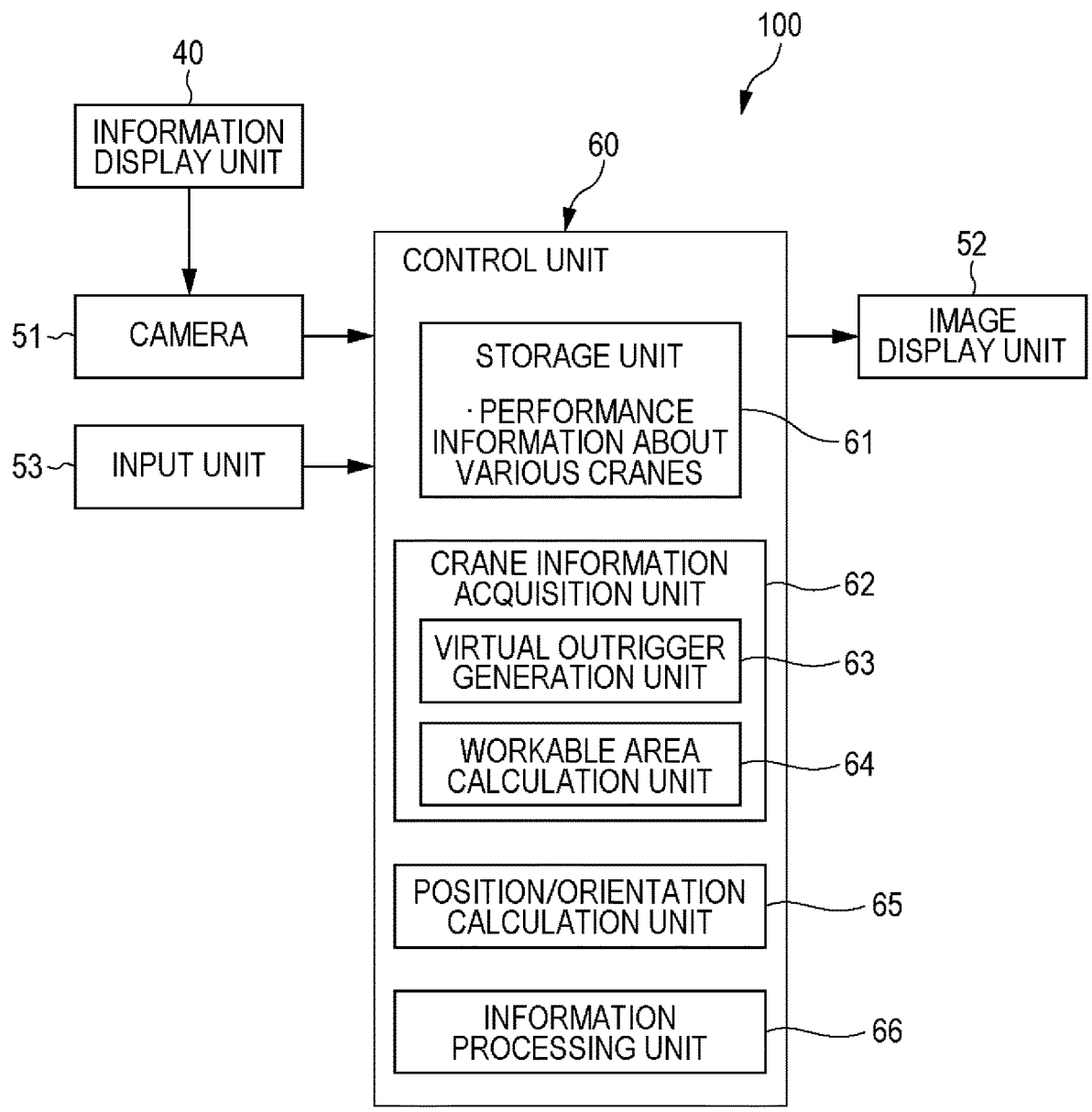
FIG. 2 is a block diagram illustrating a functional configuration of the crane information display system according to Example 1.
Figure 3:
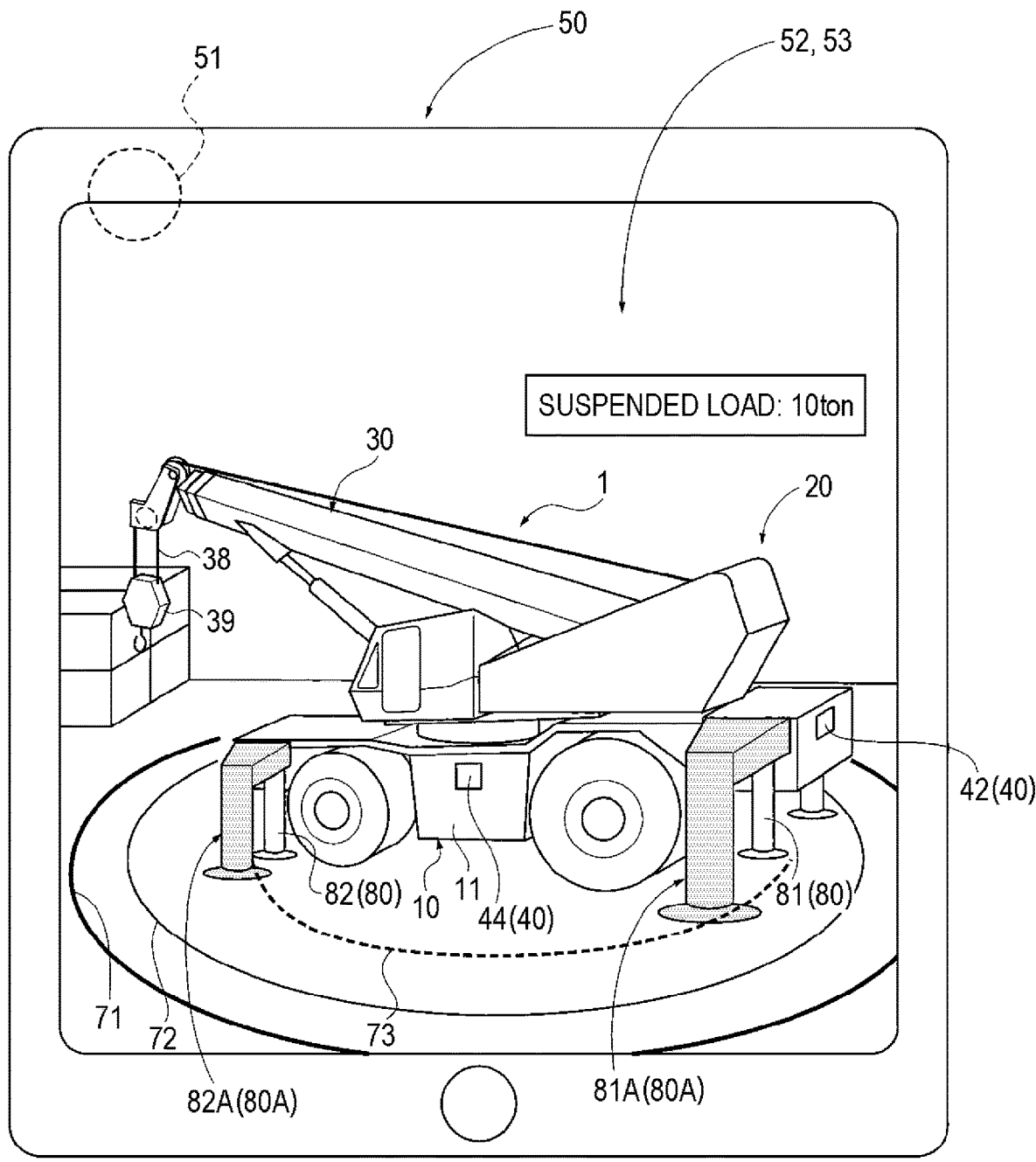
FIG. 3 is a diagram illustrating an image displayed on an image display unit of Example 1.

FIG. 2 is a block diagram illustrating a functional configuration of the crane information display system 100 of Example 1. FIG. 3 is a diagram illustrating an image displayed on an image display unit of Example 1. Hereinafter, a functional configuration of the crane information display system 100 of Example 1 will be described.

In the crane information display system 100, an image of the information display unit 40 captured with the camera 51 and the input information input by the input unit 53 are input to the control unit 60 (in the present embodiment, a control unit built in the tablet terminal 50), and the information controlled by the control unit 60 is output by the image display unit 52.

The camera 51 can be, for example, a camera 51 provided in a general tablet terminal 50. The camera 51 can capture an image of the crane 1, a site environment around the crane 1, and the information display unit 40.

The input unit 53 can input an overhanging amount of the outrigger 80 in the horizontal direction, a suspended load, a length of the boom 30, and the like. The length of the boom 30 is, for example, the length of the boom 30 in a state where the distal end boom 36 and the intermediate booms 32 to 35 are stored in the proximal end boom 31 (a fully contracted state), the length of the boom 30 in a state where the distal end boom 36 is extended, or the length in a state in which the distal end boom 36 and the intermediate booms 32 to 35 are extended (a fully extended state).

The control unit 60 includes a storage unit 61, a crane information acquisition unit 62, a position/orientation calculation unit 65, and an information processing unit 66. The control unit 60 is a known microcomputer including, for example, a central processing unit (CPU), a random access memory (RAM), a read only memory (ROM), and the like, and functions of the control unit 60 (the crane information acquisition unit 62, the position/orientation calculation unit 65, and the information processing unit 66) are achieved by, for example, the CPU referring to a control program or various data stored in the storage unit 61 (for example, an HDD), the ROM, or the RAM.

The storage unit 61 stores performance information about various cranes. The performance information includes, for example, information on the shape of the outrigger 80, information about a workable area in the horizontal direction and information about a workable area in the height direction according to the overhanging amount of the outrigger 80 and the length of the boom 30, information about a derricking angle range of the boom 30, information on a load factor, information on a tail swing area, and the like.

The crane information acquisition unit 62 acquires information about the model of the crane 1 based on the image of the information display unit 40 captured with the camera 51, and acquires performance information about the acquired model of the crane 1 from the storage unit 61. That is, the crane information acquisition unit 62 reads the image of the information display unit 40 captured with the camera 51 (that is, the display information of the information display unit 40 is read from the camera image), acquires the model of the crane 1, and acquires the performance information of the acquired model from the storage unit 61.

The crane information acquisition unit 62 includes a virtual outrigger generation unit 63 and a workable area calculation unit 64.

The virtual outrigger generation unit 63 generates three-dimensional data (that is, image information about the three-dimensional image of the outrigger 80) of the virtual outrigger as the information of the crane 1 based on the information on the shape of the outrigger 80 stored in the storage unit 61 (that is, the shape of the outrigger 80 corresponding to the model of the crane 1 specified from the display information of the information display unit 40) and the overhanging amount of the outrigger 80 in the horizontal direction input to the input unit 53.

The workable area calculation unit 64 refers to the information about the model of the crane 1 specified from the display information of the information display unit 40, and calculates the workable area of the crane 1 as the information about the crane 1 based on the suspended load input to the input unit 53 and the length of the boom 30. The workable area calculation unit 64 can calculate workable areas with a plurality of load factors. In Example 1, the workable area calculation unit 64 calculates a workable area with a load factor of 80% and a workable area with a load factor of 100%. A workable area is an area where work can be performed in the horizontal direction of the crane 1 on the installation surface of the crane 1.

The position/orientation calculation unit 65 calculates the position and orientation of the crane 1 based on the image of the information display unit 40 captured with the camera 51.

Specifically, the position/orientation calculation unit 65 reads the image of the information display unit 40 captured with the camera 51 (that is, the display information of the information display unit 40 is read from the image of the camera 51), acquires information about the position (that is, the mounting position of the information display unit 40) where the information display unit 40 is attached to the crane 1, and calculates the orientation of the crane 1.

For example, when the image of the information display unit 40 captured with the camera 51 shows the first information display unit 41, since the first information display unit 41 is attached to the front surface of the vehicle body frame 11, the camera 51 captures an image of the crane 1 facing forward. When the image of the information display unit 40 captured with the camera 51 shows the second information display unit 42, since the second information display unit 42 is attached to the rear surface of the vehicle body frame 11, the camera 51 captures an image of the crane 1 facing rearward. When the image of the image of the information display unit 40 captured with the camera 51 shows the third information display unit 43, since the third information display unit 43 is attached to the right side surface of the vehicle body frame 11, the camera 51 captures an image of the crane 1 facing rightward. When the image of the information display unit 40 captured with the camera 51 shows the fourth information display unit 44, since the fourth information display unit 44 is attached to the left side surface of the vehicle body frame 11, the camera 51 captures an image of the crane 1 facing leftward.

The position/orientation calculation unit 65 acquires information about the orientation of the crane 1 based on the shape (hereinafter, referred to as a "contour shape of the information display unit 40") of the information display unit 40 captured with the camera 51 and the reference shape of the information display unit 40 recorded in the information display unit 40. That is, the position/orientation calculation unit 65 reads the display information (that is, code information) of the information display unit 40 from the image of the camera 51 to acquire information related to the reference shape of the information display unit 40, and extracts the contour shape of the information display unit 40 reflected in the camera 51 from the image of the camera 51 by known pattern matching or the like. Then, the position/orientation calculation unit 65 calculates information about the orientation of the crane 1 by comparing the contour shape of the information display unit 40 reflected in the image of the camera 51 with the reference shape of the information display unit 40.

For example, in a case where the information display unit 40 captured with the camera 51 is the first information display unit 41 and has a rectangular shape recorded in the first information display unit 41 (that is, in a case where both the contour shape of the first information display unit 41 reflected in the image of the camera 51 and the reference shape of the first information display unit 41 specified from the display information of the first information display unit 41 are rectangular), the crane 1 is in an orientation facing straight forward with respect to the camera 51. When the information display unit 40 captured with the camera 51 is the first information display unit 41, is not the rectangular shape recorded in the first information display unit 41, and is a trapezoid in which the left edge of the information display unit 40 is longer (higher) than the right edge (that is, the contour shape of the first information display unit 41 reflected in the image of the camera 51 is a trapezoid of which the left edge is longer than the right edge, and the reference shape of the first information display unit 41 specified from the display information of the first information display unit 41 is a rectangular shape), the crane 1 is in an orientation facing slightly left from the straight front with respect to the camera 51. When the information display unit 40 captured with the camera 51 is the first information display unit 41, is not the rectangular shape recorded in the first information display unit 41, and is a trapezoid in which the right edge of the information display unit 40 is longer than the left edge (that is, the contour shape of the first information display unit 41 reflected in the image of the camera 51 is a trapezoid of which the right edge is longer than the left edge, and the reference shape of the first information display unit 41 specified from the display information of the first information display unit 41 is a rectangular shape), the crane 1 is in an orientation facing slightly right from the straight front with respect to the camera 51.

That is, the position/orientation calculation unit 65 compares the shape of the information display unit 40 captured with the camera 51 with the shape of the information display unit 40 recorded in the information display unit 40, and acquires information about the orientation of the crane 1.

The position/orientation calculation unit 65 acquires information about the position of the crane 1 based on the size of the contour shape of the information display unit 40 captured with the camera 51 and the reference size of the information display unit 40 recorded in the information display unit 40. Specifically, the position/orientation calculation unit 65 compares the reference size of the information display unit 40 recorded in the information display unit 40 with the size of the contour shape of the information display unit 40 captured with the camera 51, and calculates the distance from the camera 51 to the information display unit 40.

The information processing unit 66 processes the performance information of the crane 1 acquired by the crane information acquisition unit 62, the virtual outrigger generated by the virtual outrigger generation unit 63, and the workable area of the crane 1 calculated by the workable area calculation unit 64 into information corresponding to the position and the orientation of the crane 1 calculated by the position/orientation calculation unit 65.

That is, the information processing unit 66 processes the information about the crane 1 acquired by the crane information acquisition unit 62 into information corresponding to the position and the orientation of the crane 1 calculated by the position/orientation calculation unit 65. In other words, the information processing unit 66 converts the information about the crane 1 acquired by the crane information acquisition unit 62 into three-dimensional image information corresponding to the position and the orientation of the crane 1 calculated by the position/orientation calculation unit 65. For example, when the crane 1 is viewed from the capturing position of the camera 51, the information processing unit 66 converts the three-dimensional image of a virtual outrigger 80A so that the three-dimensional image of the virtual outrigger 80A becomes an image simulating a state where the outrigger 80 is actually overhung. Such image processing of the information processing unit 66 is achieved by known coordinate conversion processing or the like.

The image display unit 52 displays the information (that is, information about the crane 1 converted into image information to be displayed by the information processing unit 66) processed by the information processing unit 66 to be superimposed on the image of the camera 51. Specifically, as illustrated in FIG. 3, the image display unit 52 superimposes and displays the tail swing area 73 of the crane 1 acquired by the crane information acquisition unit 62, the virtual outrigger 80A generated by the virtual outrigger generation unit 63, and workable areas 71 and 72 of the crane 1 calculated by the workable area calculation unit 64 on the image of the crane 1 and the site environment around the crane 1 captured with the camera 51. The image display unit. 52 displays the suspended load input to the input unit 53.

That is, the image display unit 52 displays the workable areas 71 and 72 of the crane 1, the virtual outrigger 80A of the crane 1, and the tail swing area. 73 of the crane 1 in a three-dimensional image so as to be superimposed on the crane 1 or the surrounding environment of the crane 1 reflected in the image of the camera 51 so that the user can three-dimensionally examine how each part of the crane 1 affects the site environment when the crane 1 is actually operated on site. The image display unit 52 displays the virtual outrigger 80A at the position of the outrigger of the crane 1 reflected in the image of the camera 51, for example. In addition, the image display unit 52 also displays the workable areas 71 and 72 of the crane 1 around the crane 1 reflected in the image of the camera 51, for example. In addition, the image display unit 52 displays the tail swing area 73 of the crane 1 around the swivel base of the crane 1 shown in the image of the camera 51, for example.

The virtual outrigger 80A includes a virtual front outrigger 82A and a virtual rear outrigger 81A. The workable area of the crane 1 includes a workable area 72 with a load factor of 80% and a workable area 71 with a load factor of 100%.

[Flow of Processing by Control Unit]

Figure 4:
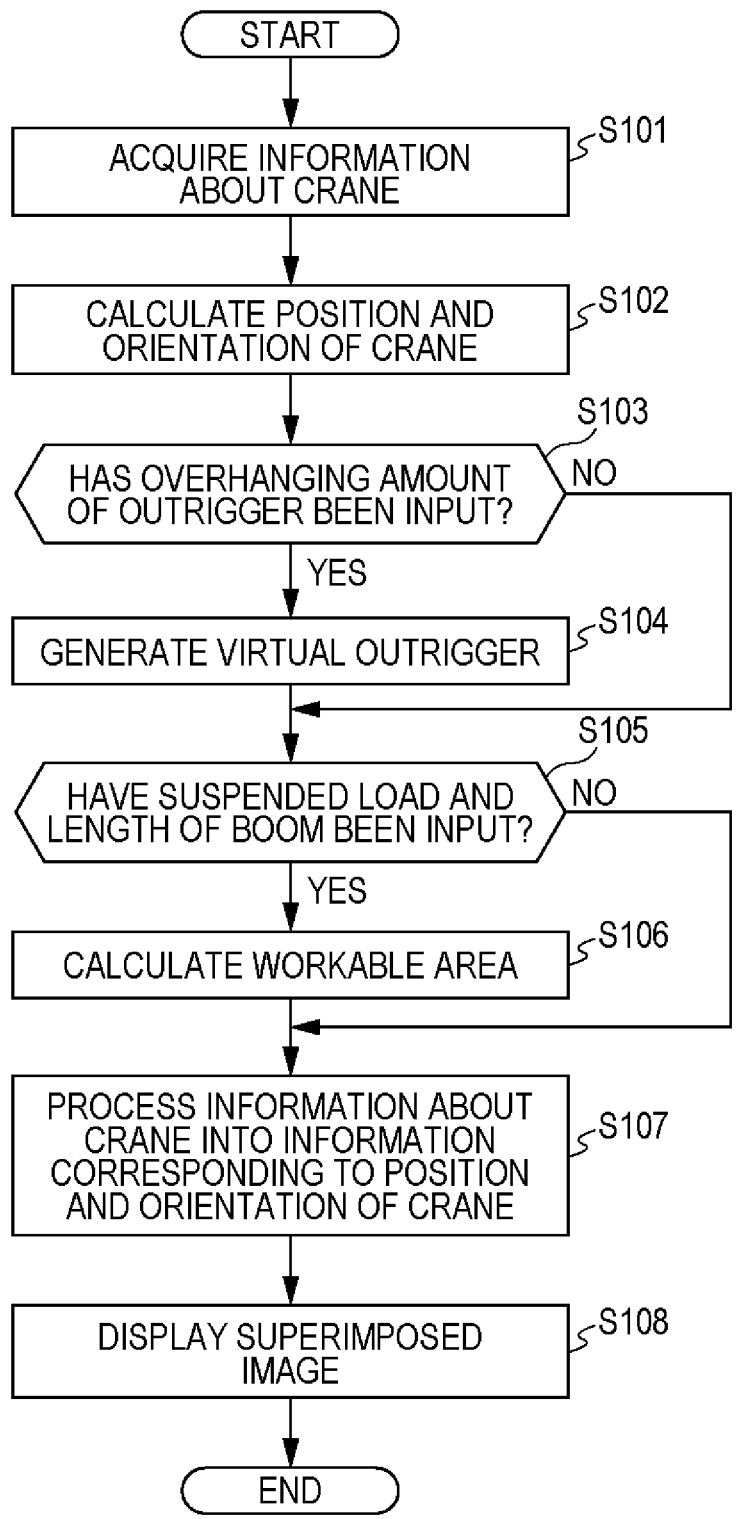
FIG. 4 is a flowchart illustrating a flow of processing by a control unit of the crane information display system of Example 1.

FIG. 4 is a flowchart illustrating a flow of processing by the control unit. 60 of the crane information display system 100 of Example 1. Hereinafter, a flow of processing by the control unit 60 of the crane information display system 100 according to Example 1 will be described.

When the worker M captures an image of the crane 1 installed at the work site and the surrounding site environment with the camera 51 of the tablet terminal 50, as illustrated in FIG. 4, the crane information acquisition unit 62 acquires information about the model of the crane 1 based on the information display unit 40 captured with the camera 51 (step S101).

Next, the position/orientation calculation unit 65 calculates the position and orientation of the crane 1 based on the information display unit 40 captured with the camera 51 (step S102).

Next, the control unit 60 determines whether the overhanging amount of the outrigger 80 has been input to the input unit 53 (step S103). In a case where it is determined that the overhanging amount of the outrigger 80 is input to the input unit 53 (YES in step S103), the virtual outrigger generation unit 63 generates the virtual outrigger 80A (step S104), and the process proceeds to step S105. On the other hand, in a case where the overhanging amount of the outrigger 80 is not input to the input unit 53 (NO in step S103), the process proceeds to step S105.

Next, the control unit 60 determines whether the suspended load and the length of the boom 30 have been input to the input unit 53 (step S105). In a case where it is determined that the suspended load and the length of the boom 30 are input to the input unit 53 (YES in step S105), the workable area calculation unit 64 calculates the workable areas 71 and 72 (step S106), and the process proceeds to step 107. On the other hand, in a case where it is determined that the suspended load and the length of the boom 30 are not input to the input unit 53 (NO in step S105), the process proceeds to step S107.

Next, the information processing unit 66 processes the information about the crane 1 acquired by the crane information acquisition unit 62 into information corresponding to the position and the orientation of the crane 1 calculated by the position/orientation calculation unit 65 (step S107). That is, the information processing unit 66 processes the performance information of the crane 1 acquired by the crane information acquisition unit 62, the virtual outrigger 80A generated by the virtual outrigger generation unit 63, and the workable areas 71 and 72 of the crane 1 calculated by the workable area calculation unit 64 into information corresponding to the position and the orientation of the crane 1 calculated by the position/orientation calculation unit 65.

Next, the image display unit 52 superimposes and displays the tail swing area 73 of the crane 1 acquired by the crane information acquisition unit 62, the virtual outrigger 80A generated by the virtual outrigger generation unit 63, and workable areas 71 and 72 of the crane 1 calculated by the workable area calculation unit 64 on the image of the crane 1 and the site environment around the crane 1 captured with the camera 51 (step S108), and ends the processing.

[Operation of Crane Information Display System]

Hereinafter, an operation of the crane information display system 100 of Example 1 will be described.

The crane information display system 100 according to Example 1 includes: the crane information acquisition unit 62 that acquires information about the crane 1 by capturing the information display unit 40 that displays information about the crane 1 by the camera 51, the information display unit 40 being provided in the crane 1; the position/orientation calculation unit 65 that calculates a position and an orientation of the crane 1 based on the information display unit 40 captured with the camera 51; the information processing unit 66 that processes the information about the crane acquired by the crane information acquisition unit 62 into information corresponding to the position and the orientation of the crane 1 calculated by the position/orientation calculation unit 65; and the image display unit 52 that displays the information processed by the information processing unit 66 to be superimposed on an image captured with the camera 51 (FIG. 2).

As a result, the information about the crane 1 can be superimposed and displayed on the image obtained by capturing the crane 1 and the surroundings thereof. Therefore, at the work site, the crane 1, the site environment around the crane 1, and the information about the crane 1 can be confirmed by a three-dimensional mage in real time. As a result, a work plan of the crane 1 can be examined in real time at the work site.

The crane information display system 100 of Example 1 includes the input unit 53 that inputs the overhanging amount of the outrigger 80 of the crane 1, and the crane information acquisition unit 62 includes the virtual outrigger generation unit 63 that generates the three-dimensional virtual outrigger 80A based on the input value to the input unit 53 (FIG. 2).

As a result, the virtual outrigger 80A having the overhanging amount corresponding to the input value can be superimposed and displayed on the image obtained by capturing the crane 1 and the surroundings thereof. Therefore, at the work site, the overhanging amount of the outrigger 80 can be confirmed on a three-dimensional image in real time.

The crane information display system 100 of Example 1 includes the input unit 53 that inputs the suspended load and the length of the boom 30 of the crane 1, and the crane information acquisition unit 62 includes the workable area calculation unit 64 that calculates the workable areas 71 and 72 of the crane 1 based on the input value to the input unit 53 (FIG. 2).

As a result, it is possible to display the workable areas 71 and 72 for a predetermined suspended load in an overlapping manner based on the length of the boom 30 on the image obtained by capturing the crane 1 and the surroundings thereof. Therefore, at the work site, the workable areas 71 and 72 can be confirmed by a three-dimensional image in real time.

In the crane information display system 100 of Example 1, the information about the crane 1 includes the tail swing area 73 of the crane 1 (FIG. 3).

As a result, the tail swing area 73 can be superimposed and displayed on the image obtained by capturing the crane 1 and the surroundings thereof. Therefore, at the work site, the tail swing area 73 can be confirmed by a three-dimensional image in real time.

The crane information display system of the present invention has been described above based on Example 1. However, the specific configuration is not limited to this example, and design changes, additions, and the like are allowed without departing from the gist of the invention according to each claim of the claims.

In Example 1, an example in which the information display unit 40 is an April Tag has been described. However, the information display unit is not limited to this mode, and may be a two-dimensional code such as a QR code (registered trademark). In addition, a crane itself may be used as the information display unit, and information of the crane may be acquired by image recognition using deep learning.

In Example 1, an example in which one April Tag as the information display unit 40 is attached to each of the front surface, the rear surface, the right side surface, and the left side surface of the vehicle body frame 11 of the crane 1 has been described. However, two or more information display units 40 may be attached to each of the front surface, the rear surface, the right side surface, and the left side surface of the vehicle body frame 11 of the crane 1.

In Example 1, an example has been described in which the workable area 72 with a load factor of 80% and the workable area 71 with a load factor of 100% are displayed on the image display unit 52. However, one workable area may be displayed on the image display unit, or three or more workable areas may be displayed on the image display unit. The load factor of the workable area is not limited to 80% or 100%.

In Example 1, the user terminal is the tablet terminal 50 including the camera 51, the input unit 53, and the image display unit 52. However, the user terminal may be a smartphone. Further, in the user terminal, the camera and the image display unit may be separate bodies.

In Example 1, an example is which the performance information of the crane 1 is stored in the storage unit 61 has been described. However, the performance information of the crane may be stored in the information display unit.

The entire disclosure of the specification, drawings, and abstract included in Japanese Patent Application No. 2019-176758 filed on Sep. 27, 2019 is incorporated herein by reference.

REFERENCE SIGNS LIST 1 crane
40 Information display unit
50 tablet terminal
51 camera
52 image display unit
53 input unit
80 outrigger
80A virtual outrigger
60 control unit 61 storage unit
62 crane information acquisition unit
63 virtual outrigger generation unit
64 workable area calculation unit
65 position/orientation calculation unit
66 information processing unit
71 workable area
72 workable area
73 tail swing area
100 crane information display system

The invention claimed is:

1. A crane information display system that is provided with a terminal device having a camera and captures an image of a crane with the camera to obtain a camera image, the crane information display system comprising:
   a hardware processor configured to:
      receive an input of an overhanging amount of an outrigger of the crane from a user;
      read display information of an information display unit, which is mounted in the crane, from the camera image and acquires information about the outrigger of the crane;
      generate image information of a virtual outrigger corresponding to a three-dimensional image of the outrigger based on the acquired information about the outrigger of the crane and the input overhanging amount of the outrigger;
      read display information of the information display unit, acquire information about a reference shape of the information display unit and a mounting position of the information display unit on the crane from the camera image, extract a contour shape of the information display unit reflected in the camera image, and calculate a position and an orientation of the crane based on information about the reference shape of the information display unit, the mounting position of the information display unit, and the contour shape of the information display unit;
      convert the image information of the virtual outrigger into three-dimensional image information corresponding to the calculated position and orientation of the crane; and
      overlay the converted image information of the virtual outrigger on the camera image and display the information on a graphical computer display, the image information of the virtual outrigger being overlaid on the crane and the surroundings thereof in the camera image.

2. A crane information display system that is provided with a terminal device having a camera and captures an image of a crane with the camera to obtain a camera image, the crane information display system comprising:
   a hardware processor configured to:
      receive an input of a suspended load of a boom of the crane and a length of the boom of the crane from an user;
      read display information of an information display unit, which is mounted in the crane, from the camera image and acquires information about a model of the crane;
      calculate a workable area of the crane based on the information about the model of the crane acquired and the suspended load of a boom of the crane and a length of the boom of the crane input;
      read display information of the information display unit, acquire information about a reference shape of the information display unit and a mounting position of the information display unit on the crane from the camera image, extract a contour shape of the information display unit reflected in the camera image, and calculate a position and an orientation of the crane based on information about the reference shape of the information display unit, the mounting position of the information display unit, and the contour shape of the information display unit;
      convert the workable area of the crane into three-dimensional image information corresponding to the calculated position and orientation of the crane; and
      overlay the converted three-dimensional image information of the workable area of the crane on the camera image and display the information on a graphical computer display, the three-dimensional image information of the workable area being overlaid on the crane and the surroundings thereof in the camera image.

* * * * *